US009735605B2

(12) United States Patent
Garcia Briz et al.

(10) Patent No.: US 9,735,605 B2
(45) Date of Patent: Aug. 15, 2017

(54) METHODS AND SYSTEMS FOR OBJECT DETECTION AND SENSING FOR WIRELESS CHARGING SYSTEMS

(71) Applicant: QUALCOMM Incorporated, San Diego, CA (US)

(72) Inventors: Alberto Garcia Briz, Munich (DE); Andrew M. Gilbert, Bampton (GB); Grzegorz Ombach, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 14/307,285

(22) Filed: Jun. 17, 2014

(65) Prior Publication Data

US 2015/0364944 A1    Dec. 17, 2015

(51) Int. Cl.
*H02J 7/02*         (2016.01)
*H02J 5/00*         (2016.01)
*B60L 11/18*        (2006.01)
*G01D 21/02*        (2006.01)
*H02J 7/00*         (2006.01)
*H02J 7/04*         (2006.01)

(52) U.S. Cl.
CPC ............. *H02J 7/025* (2013.01); *B60L 11/182* (2013.01); *G01D 21/02* (2013.01); *H02J 5/005* (2013.01); *H02J 7/0029* (2013.01); *H02J 7/04* (2013.01); *Y02T 10/7005* (2013.01); *Y02T 10/7072* (2013.01); *Y02T 90/122* (2013.01); *Y02T 90/14* (2013.01)

(58) Field of Classification Search
CPC .......... H02J 7/025; H02J 5/005; B60L 11/182
See application file for complete search history.

(56) References Cited

U.S. PATENT DOCUMENTS

| 8,598,743 B2 | 12/2013 | Hall et al. |
| 2005/0270175 A1 | 12/2005 | Peddie et al. |
| 2011/0074346 A1 | 3/2011 | Hall et al. |
| 2012/0105252 A1* | 5/2012 | Wang ...................... E01F 11/00 340/936 |
| 2013/0193771 A1 | 8/2013 | Teggatz |

(Continued)

FOREIGN PATENT DOCUMENTS

| EP | 2985162 A1 | 2/2016 |
| JP | 2012257404 A | 12/2012 |

(Continued)

OTHER PUBLICATIONS

International Search Report and Written Opinion—PCT/US2015/035155—ISA/EPO—Aug. 24, 2015.

*Primary Examiner* — Jeffrey Shin
(74) *Attorney, Agent, or Firm* — Knobbe, Martens, Olson & Bear, LLP

(57) ABSTRACT

An apparatus and method for detecting a condition within a wireless charging field are described. In one implementation, an apparatus comprises a wireless power receiver configured to receive wireless charging power from a wireless power charging transmitter. The apparatus further comprises a first sensor circuit that is at least partially disposed within a ground surface, the first sensor being operationally coupled to and configured to be charged or powered by the wireless power receiver. The first sensor is further configured to detect the condition.

26 Claims, 8 Drawing Sheets

(56) References Cited

U.S. PATENT DOCUMENTS

2013/0241476 A1    9/2013  Okada et al.
2015/0243432 A1*   8/2015  Laifenfeld ............ B60L 11/005
                                                         324/601
2015/0303701 A1*  10/2015  Terao ...................... G01S 17/87
                                                         307/104

FOREIGN PATENT DOCUMENTS

WO    WO-9602970 A1      2/1996
WO    WO-2013088238 A2   6/2013

* cited by examiner

METHODS AND SYSTEMS FOR OBJECT DETECTION AND SENSING FOR WIRELESS CHARGING SYSTEMS

TECHNICAL FIELD

This disclosure generally relates to wireless power. More specifically, the disclosure is directed to devices, systems, and methods related to foreign object detection and sensor integration for wireless power transfer systems.

BACKGROUND

Wireless power transfer systems may differ in many aspects including circuit topologies, magnetics layout, and power transmission capabilities or requirements. The amount of power transferred between components of a wireless charging system may be affected by foreign objects in the vicinity of the main charging pad, further leading to safety concerns regarding the heating of such foreign objects. Thus, there is a need in the art to improve detection of presence of foreign objects between a main charging pad and an electric vehicle.

SUMMARY

An apparatus for detecting a condition within a wireless charging field is provided. The apparatus comprises a wireless power receiver configured to receive wireless charging power from a wireless power charging transmitter. The apparatus further comprises a first sensor circuit that is at least partially disposed within a ground surface. The first sensor is operationally coupled to and configured to be charged or powered by the wireless power receiver, and further configured to detect the condition.

A method for detecting a condition within a wireless charging field is provided. The method comprises receiving wireless charging power from a wireless power charging transmitter at a wireless power receiver. The method further comprises detecting the condition at a first sensor circuit that is at least partially disposed within a ground surface, operationally coupled to the wireless power receiver, and charged or powered by the wireless power receiver.

An apparatus for detecting a condition within a wireless charging field is provided. The apparatus comprises means for receiving wireless charging power from a wireless power charging transmitter. The apparatus further comprises first means for detecting the condition. The first detecting means is at least partially disposed within a ground surface and operationally coupled to and charged or powered by the receiving means.

An apparatus for providing wireless power is provided. The apparatus comprises a wireless power transmitter configured to provide wireless power to a first sensor circuit. The apparatus further comprises a first controller configured to receive information from the first sensor circuit. The information is indicative of the presence of a foreign object. The first controller is further configured to reduce power transmitted from the wireless power transmitter to an electric vehicle in response to the information.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

Foreign object detection (FOD) sensors integrated with a primary charging pad of an inductive power transfer (IPT) system may be implemented either as a sensing mat integrated with the main charging pad or implemented as individual sensors placed on the pad surface. Accordingly, it is desirable to improve FOD resolution when the main charging pad is mounted within or beneath the surface of the ground.

Figure 1:
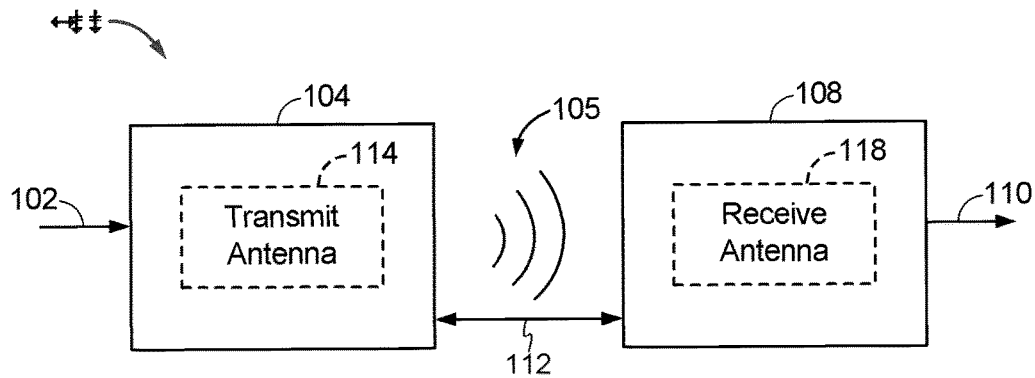
FIG. 1 is a functional block diagram of a wireless power transfer system, in accordance with one exemplary implementation.

FIG. 1 is a functional block diagram of a wireless power transfer system 100, in accordance with one exemplary implementation. An input power 102 may be provided to a transmitter 104 from a power source (not shown) to generate a wireless (e.g., magnetic or electromagnetic) field 105 for performing energy transfer. A receiver 108 may couple to the wireless field 105 and generate an output power 110 for storing or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may utilize large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling mode region.

Figure 2:
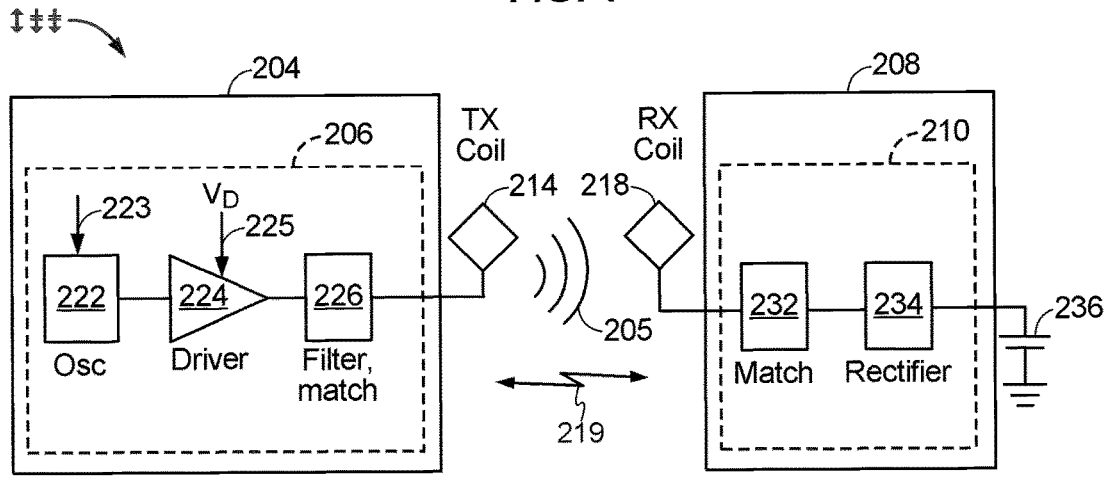
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of an electric vehicle, for example.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
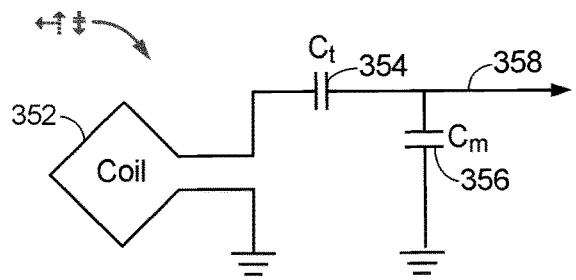
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2 including a transmit or receive antenna, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled mode region of the transmit antenna 214 may be more powerful.

As stated, efficient transfer of energy between the transmitter 104/204 and the receiver 108/208 may occur during matched or nearly matched resonance between the transmitter 104/204 and the receiver 108/208. However, even when resonance between the transmitter 104/204 and receiver 108/208 are not matched, energy may be transferred, although the efficiency may be affected. For example, the efficiency may be less when resonance is not matched. Transfer of energy occurs by coupling energy from the wireless field 105/205 of the transmit coil 114/214 to the receive coil 118/218, residing in the vicinity of the wireless field 105/205, rather than propagating the energy from the transmit coil 114/214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance to sustain resonance may decrease as the diameter or inductance of the loop increases.

Furthermore, as the diameter of the antenna increases, the efficient energy transfer area of the near field may increase. Other resonant circuits formed using other components are also possible. As another non limiting example, a capacitor may be placed in parallel between the two terminals of the circuitry 350. For transmit antennas, the signal 358, with a frequency that substantially corresponds to the resonant frequency of the antenna 352, may be an input to the antenna 352.

Referring to FIGS. 1 and 2, the transmitter 104/204 may output a time varying magnetic (or electromagnetic) field with a frequency corresponding to the resonant frequency of the transmit coil 114/214. When the receiver 108/208 is within the wireless field 105/205, the time varying magnetic (or electromagnetic) field may induce a current in the receive coil 118/218. As described above, if the receive coil 118/218 is configured to resonate at the frequency of the transmit coil 114/214, energy may be efficiently transferred. The AC signal induced in the receive coil 118/218 may be rectified as described above to produce a DC signal that may be provided to charge or to power a load.

Figure 4:
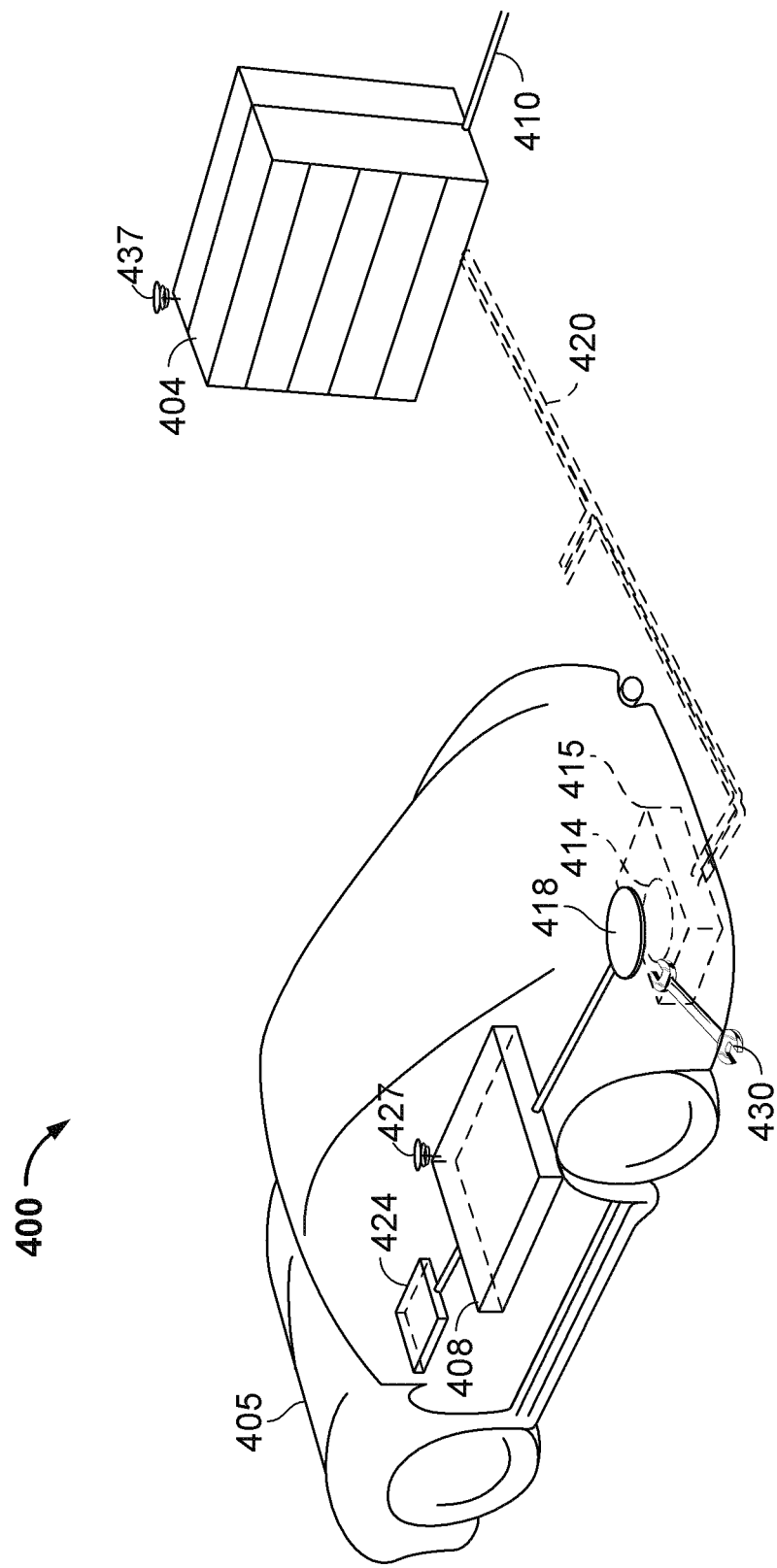
FIG. 4 is a diagram of a vehicle aligned over a transmitter coil, in accordance with another exemplary implementation of a stationary wireless charging system.

FIG. 4 is a diagram of a vehicle aligned over a transmitter coil, in accordance with an exemplary implementation of a stationary wireless charging system. The stationary wireless power transfer system 400 enables charging of a vehicle 405 while the vehicle 405 is parked near the transmitter 404. Space is shown for the vehicle 405 to be parked over the transmit coil 414 (analogous to the transmit coil 114/214). The transmit coil 414 (shown in dashed lines) may be located within a base pad 415 (shown in dashed lines). In some implementations, the transmitter 404 may be connected to a power backbone 410 (e.g., a power grid). The transmitter 404 may be configured to provide an alternating current (AC), through an electrical connection 420, to the transmit coil 414 located within the base pad 415. The vehicle 405 may include a battery 424, the receive coil 418 (analogous to the receive coil 118/218), and the antenna 427, each connected to the receiver 408.

In some implementations, the receive coil 418 may receive power when the receive coil 418 is located in a wireless (e.g., magnetic or electromagnetic) field produced by the transmit coil 414. The wireless field corresponds to a region where energy output by the transmit coil 414 may be captured by the receive coil 418. In some cases, the wireless field may correspond to the "near field" of the transmit coil 414.

A foreign object 430 is also shown in the vicinity of the base pad 415 and transmit coil 414. The foreign object 430 may comprise any object not part of the wireless charging system and/or not intended to be present during the charging process between transmit coil 414 and receive coil 418. For example, in an embodiment of the wireless charging system 500 implemented in a garage, foreign object 430 may be a tool (e.g., a wrench, a hammer, etc.).

The foreign object 430 may present several problems for the wireless charging system 400. The foreign object 430 may interfere with the charging process by distorting the near field of the transmit coil 414, decreasing the efficiency of the system, or interrupting charging altogether. The foreign object 430 may absorb energy from the transmit coil 414 presenting a heating or fire hazard to both the system 400 and to bystanders. Where the foreign object 430 is a metallic object (e.g., a wrench), these problems may be magnified, especially if the foreign object 430 is ferromagnetic. As noted, the effectiveness of the overall system may be detrimentally affected by the presence of foreign object 430, thus sensors for the detection of the foreign object 430 are desirable. Certain embodiments of such sensors are disclosed and described below in the following figures.

Figure 5:
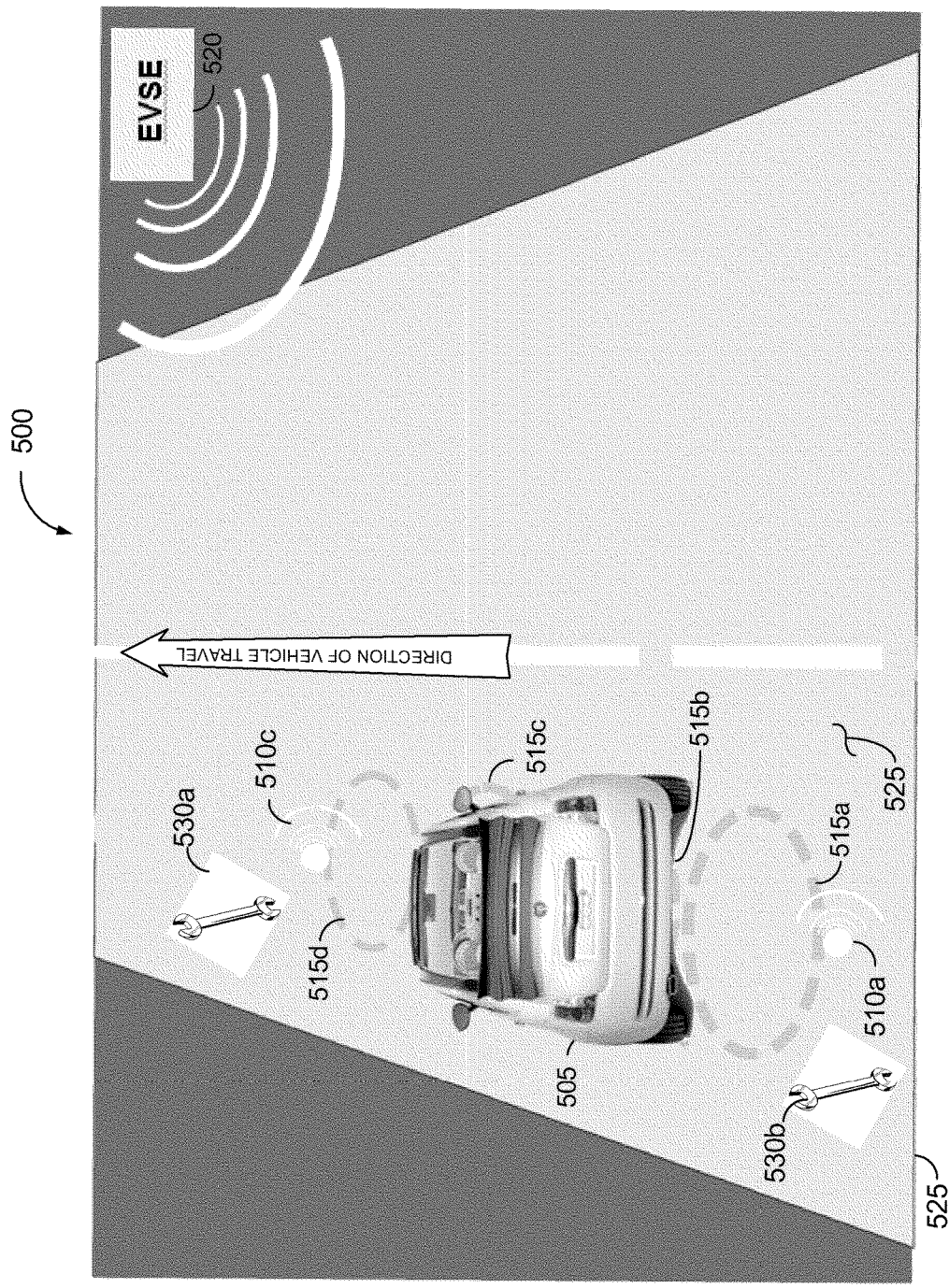
FIG. 5 is a perspective view an electric vehicle traveling along a roadway over a wireless power transfer system in accordance with another exemplary implementation of a dynamic wireless charging system.

FIG. 5 is a perspective view of an electric vehicle traveling along a roadway over a wireless power transfer system in accordance with another exemplary implementation of a dynamic wireless charging system. The electric vehicle 505 is traveling along a roadway in the left lane passing sequentially over each of four charging base pads 515a-d of a dynamic wireless charging system 500. The electric vehicle 505 is traveling along the roadway 525, from the bottom of the page to the top, crossing each of the four charging base pads 515a-d, positioned linearly, from end to end along the center of a left lane 526. The charging base pad 515a is the first of the four passed by the electric vehicle 505. The left lane 526 may also include one or more proximity devices 510a-510c located among and around in proximity to the charging base pads 515a-515d. System 500 may comprise proximity devices 510a-510c in order to provide an indication to the system 500 that a vehicle 505 is approaching. In response to the presence of the vehicle 505, the proximity devices may alert an Electric Vehicle Support Equipment (EVSE) 520, that may command the activation or deactivation of the charging base pads 515a-515d. As shown in FIG. 5, the activation of charging base pads 515a-515d may be accomplished in sequence to provide the wireless power to the vehicle 505.

The EVSE may comprise a plurality of electronic components and processors, (such as those discussed with respect to FIG. 6A, below) configured to communicate with vehicle 505 and control the operations of the dynamic wireless charging system 500. The EVSE 520 may provide control signals to a controller (not shown) that may provide signals to activate or deactivate the charging base pads 515a-515d and the overall charging process of wireless charging system 500. As will be discussed in FIG. 6A, the controller may receive input and provide specific commands to the charging base pads 515a-515d.

EVSE 520 may be electrically connected (not shown) to each of the charging base pads 515a-515d and the proximity devices 510a-510c, to receive and process charging requests from the passing electric vehicle 505 on the roadway 525. The EVSE 520 may also broadcast the services of the dynamic wireless charging system 500 to the passing electric vehicle 505. The EVSE 520 may control the charging processes of the system 500 determine whether the electric vehicle 605 is permitted to receive a charge from the charging base pads 515a-515d.

If the electric vehicle 505 is determined to be allowed to receive a charge, the EVSE 520 may provide additional communications or visual indicators (not shown in this figure) regarding the alignment of the electric vehicle 505 along the width of the roadway 525 to the electric vehicle 505 or to the operator therein.

The EVSE 520 and more particularly the controller (not shown) may utilize information regarding the proximity of an electric vehicle 505 from the proximity sensors 510a-510c to sequentially power up and power down the charging base pads 515a-515d in response to the presence (or absence) of the vehicle 505. The dynamic charging system 500 may comprise communications between the EVSE 520, the vehicle 505, and at least the proximity sensors 510a-510c and charging pads 515a-515d in order to provide wireless power transfer to the vehicle 505.

Because the roadway 525 is open to contamination from objects falling from passing traffic or otherwise being blown or dropped in the roadway 525, FOD is a further concern in the embodiment described by FIG. 4. As shown in FIG. 5, foreign objects 530a, 530b may be present on the road 525, detrimentally affecting the transfer of power from the charging pads 515a-515d to the charging system of vehicle 505. Similar to the stationary wireless charging system 400, the presence and/or type of foreign objects 530 (e.g., metallic or ferromagnetic objects) may also present a road hazard or a heating hazard.

Figure 6A:
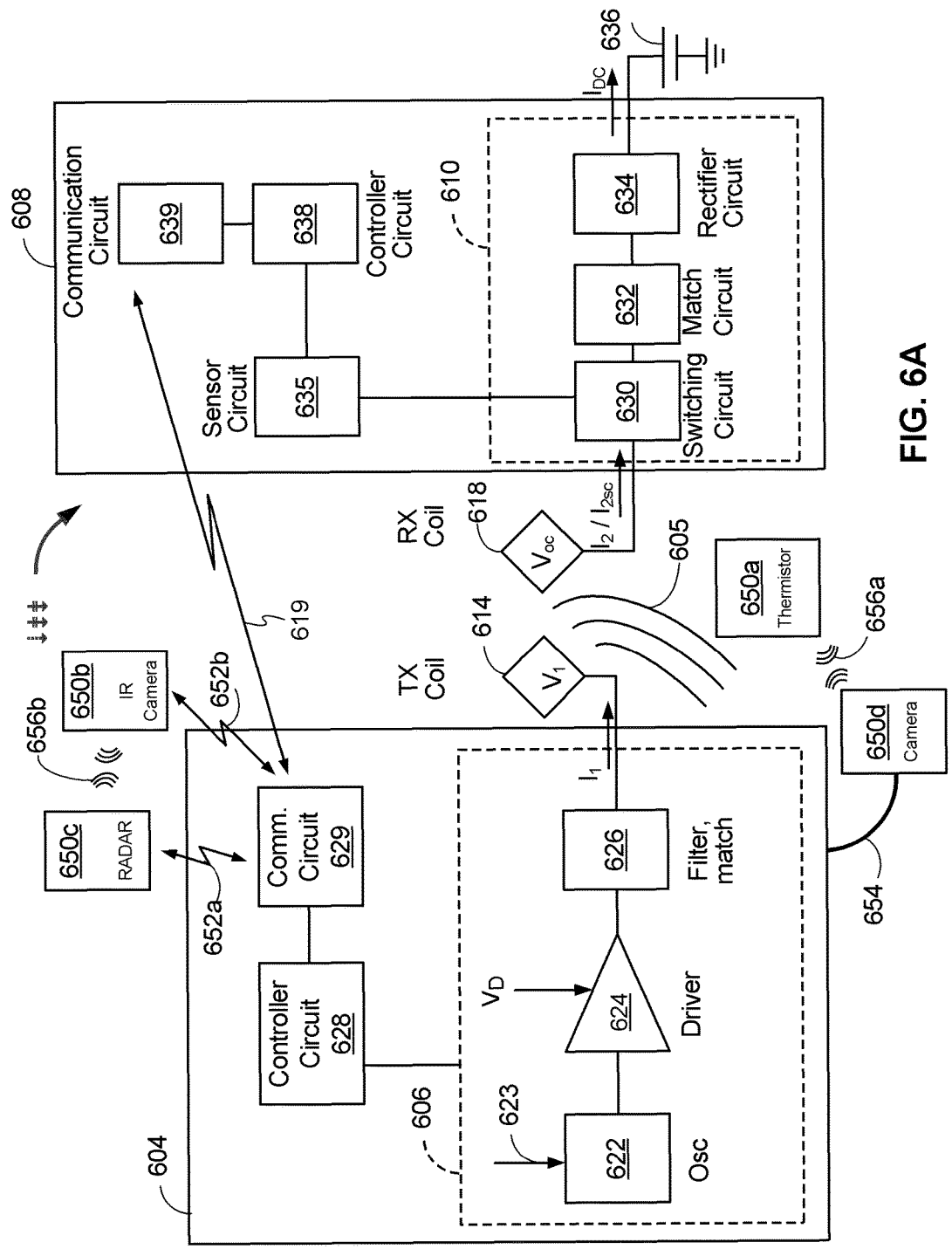
FIG. 6A is a functional block diagram of a wireless power transfer system, in accordance with an exemplary implementation.

FIG. 6A is a functional block diagram of a wireless power transfer system 600, in accordance with an exemplary implementation. The system 600 includes a transmitter 604 and a receiver 608. As shown in FIG. 6A, the transmitter 604 may include a communication circuit 629 electrically connected to a transmit circuitry 606. The transmit circuitry 606 may include an oscillator 622, a driver circuit 624, and a filter and matching circuit 626. The oscillator 622 may be configured to generate a signal at a desired frequency that may be adjusted in response to a frequency control signal 623. The oscillator 622 may provide the oscillator signal to the driver circuit 624. The driver circuit 624 may be configured to drive the transmit antenna 614 at, for example, a resonant frequency of the transmit antenna 614 based on an input voltage signal (VD) 625. In one non-limiting example, the driver circuit 624 may be a switching amplifier configured to receive a square wave from the oscillator 622 and output a sine wave.

The filter and matching circuit 626 may filter out harmonics or other unwanted frequencies and match the impedance of the transmitter 604 to the transmit antenna 614. As a result of driving the transmit antenna 614, the transmit antenna 614 may generate a wireless field 605 to wirelessly output power at a level sufficient for charging a battery 636 of an electric vehicle, for example. Unless stated otherwise, each component within the transmit circuitry 606 may have substantially the same functionality as the respective component within the transmit circuitry 206 as previously described in connection with FIG. 2.

The transmitter 604 may further include a controller circuit 628 electrically connected to the communication circuit 629. The communication circuit 629 may be configured to communicate with the communication circuit 639 within the receiver 608 over a communications link 619. Communications from the transmitter 604 to the receiver 608 via communications link 619 may comprise information regarding charging processes, including increased or decreased power capabilities of the transmitter 604 and other information associated with the charging capabilities of the transmitter 604.

The receiver 608 may comprise a receive coil 618 and a receive circuitry 610. The receive circuitry 610 may include a switching circuit 630 connected to a match circuit 632, and a rectifier circuit 634 connected to the match circuit 632. The receive coil 618 may be electrically connected to the switching circuit 630. The switching circuit may selectively connect the receive coil 618 to the match circuit 632 or short circuit terminals of the receive coil 618 together. The match circuit 632 may be electrically connected to the rectifier circuit 634. The rectifier circuit 634 may provide a DC current to a battery 636. Unless stated otherwise, each component within the receive circuitry 610 may have substantially the same functionality as the respective component within the receive circuitry 210 as previously described in connection with FIG. 2.

The receiver 608 may further include a sensor circuit 635 configured to sense a short circuit current or an open circuit voltage of the receive coil 618. A controller circuit 638 may be electrically connected to, and receive sensor data from, the sensor circuit 635. A communication circuit 639 may be connected to the controller circuit 638. The communication circuit 639 may be configured to communicate with the communication circuit 629 within the transmitter 604 over the communications link 619, similar to those noted above. Such communications may serve to indicate to the transmitter 604 specific power demands of the receiver 608, charge state of the battery 636, or other information related to the power requirements of the receiver 608.

To provide power from the transmitter 604 to the receiver 608, energy may be transmitted from the transmit coil 614 to the receive coil 618 through a wireless field (e.g., a magnetic or electromagnetic field) 605. The transmit coil 614 and the transmit circuitry 606 form a resonant circuit having a particular resonant frequency. The receive coil 618 and the receive circuitry 610 form another resonant circuit having a particular resonant frequency. Because electromagnetic losses are minimized between two coupled resonant systems having the same resonant frequency, it is desirable for the resonant frequency associated with the receive coil 618 to be substantially the same as the resonant frequency associated with the transmit coil 614. Thus, it is further desirable that the tuning topology for one or both of the transmit coil 614 and the receive coil 618 is not significantly affected by inductance or load changes.

According to the above description, the controller circuit 638 may determine the maximum possible output current or voltage for any position of the receive coil 618 with respect to the transmit coil 614. The controller circuit 638 may make such a determination before supplying current to the battery 636. In another implementation, the controller circuit 638 may make such a determination during charging of the battery 636. Such an implementation may provide a safety mechanism to ensure charging current and/or voltage remain within safe limits during the charging cycle. In yet another implementation the controller circuit 638 may make such a determination while the driver of the vehicle 405 is driving the vehicle 405 (FIG. 4) into a space for charging or when proximity sensors 510a-510c of system 500 (FIG. 5) detect the presence of a vehicle 505.

The tuning topology of a wireless charging system 600, noted above, may be detrimentally affected by the presence of a foreign object (e.g., foreign object 430 of FIG. 4, foreign object 530a, 530b of FIG. 5). When the foreign objects 430, 530 are metallic, they may interfere with the wireless field 605 by decreasing, distorting, or absorbing the wireless field 605, and disrupting power transfer from the transmit coil 614 to the receive coil 618. Accordingly, in certain embodiments, the wireless charging system 600 may further comprise one or more sensors 650a-650d, arranged in a distributed network (e.g., an array) in proximity to the transmitter 604. The sensors 650a-650d may collectively be referred to herein as sensors 650. The four sensors 650 shown should not be considered limiting; any number of sensors may be implemented without departing from the spirit of the disclosure. In an embodiment, each of the sensors 650a-650d may be distributed about or over an individual transmitter 604. The precise placement of such sensors 650 is further described below. Moreover, the sensors 650 may be employed in a stationary wireless charging system as noted with respect to FIG. 4 or in a dynamic wireless charging system as noted with respect to FIG. 5.

The sensors 650a-650d may comprise temperature sensors, infrared (IR) sensors, microwave, millimeter wave, LIDAR (e.g., LIght Detection and Ranging or Light Radar) sensors, or other applicable sensors for use in detection of a foreign object in the vicinity of the transmitter 604. As shown, the sensor 650a may be a thermistor, the sensor 650b may be a thermal (IR) camera, the sensor 650c may be a radar sensor, and the sensor 650d may be a imaging camera. As shown, the sensor 650a may provide temperature-related information to the controlled 628. If a foreign object 430, 530 is in the vicinity of the transmitter 604, it may absorb energy from the wireless field 605 and thus increase in temperature. Temperature increases (e.g. a localized temperature increase) measured by the sensor 650a may indicate the presence of the foreign object 430, 530.

The sensor 650b may provide a thermal (e.g., IR) image of the area surrounding the sensor 650b and may provide a visual detection of a foreign object 430, 530. In an embodiment, the sensor 650b may also provide a confirmation of another detection by an adjacent sensor 650 even at night or in reduced visibility. As IR energy is emitted from an object as it is heated, foreign object 430, 530 may become detectable by the sensor 650b as it absorbs energy from the transmitter 604.

The camera of the sensor 650d may provide similar capabilities as the sensor 650b independently detecting or providing a visual confirmation of a different detection of a foreign object 430, 530. The sensor 650c may comprise a radar sensor (e.g., millimeter wave radar, LIDAR, etc.) providing an electronic means to detect (or confirm detection of) the foreign object 430, 530. Each of the sensors 650 may communicate sensor information to the transmitter 604 and more specifically, the controller 629 via the communication circuitry 629.

These specific examples of the sensors 650 should not be considered limiting, as each of the sensors 650 may incorporate at least one sensor but may also incorporate multiple capabilities, increasing the overall effectiveness of the sensor array. Selection of the type of sensor may be dependent on environmental and design factors and system capabilities. Depending on a particular implementation, other capabilities such as air quality or air pollution sensors (e.g., particle sensors, or Nitrogen Oxide (NOx) sensors), in addition to other environmental conditions such as humidity are also contemplated. NOx compounds comprise a wide variety of compounds in atmospheric chemistry (for example, NO, $NO_2$) resulting from combustion processes that are considered harmful to human health.

In an embodiment, the sensors 650 may further be configured to detect an unexpected variation in the transmitted field 605, possibly indicating the presence of the foreign object 430, 530 absorbing the energy of field 605, or an object independently generating another electromagnetic signal or wireless power.

Sensor placement in the vicinity of the transmitter 604 may depend on the sensor 650 capabilities and system 600 design requirements. Each of the sensors 650 may provide information regarding the presence of a foreign object (e.g., foreign object 402, 630a, 630b) or other information pertaining to environmental or road conditions. This information may be transmitted to and/or used by other systems and subsystems (e.g., the transmitter 604) to inform a driver within the vehicle 505 of charging status, FOD, or road conditions, among other available information. In an embodiment, the sensors may indicate a degraded mode of the transmitter 604 such as a road warning and in the case of large objects or a reduced transmit power level from the coil 614 in the presence of smaller objects.

As shown, the sensors 650a-650c may be wireless sensors, having wireless communications with communications circuit 629 via links 652a, 652b. Communications from the sensors 650 to the controller 628 may comprise foreign object detection signals prompting the controller 628 to adjust wireless power output of the transmitter 604.

The sensor 650a is further shown in the near field of wireless field 605. As such, the sensor 650a may receive wireless power from transmit coil 614. It is to be appreciated that each of the wireless sensors 650a-650c may be capable of receiving wireless power from transmitter 604; however this is not shown in FIG. 6A for simplicity. The distributed and wireless power capabilities of the sensors 650 present a modular and customizable FOD system allowing easier maintenance and replacement of components.

In an embodiment, each of the sensors 650a-650c may alternatively or additionally be equipped with a power storage device, such as a battery (not shown). The ability to wirelessly or independently power (e.g., a battery) each of the sensors 650a-650c enables simplified maintenance, replacement, and/or addition and removal of the individual sensors 650.

The sensor 650d is shown having a wired link 654 to transmitter 604. Transmitter 604 provides the wired link 654 to the sensor 650d enabling communication with the transmitter 604 and power to operate. In addition to communications with the transmitter 604, each of the sensors 650a-650d may further have wired or wireless inter-sensor communication 656a-656b between each other. The sensors 650a-650d may further be equipped with enhanced communications capabilities, featuring inter-sensor communications 656 via, e.g., Bluetooth™, WiFi (e.g., 802.11), etc., or further acting as a relay node or nodes for Vehicle-to-Pad (V2P), Vehicle-to-Grid (V2G), Vehicle-to-Infrastructure (V2I), or Vehicle-to-Vehicle (V2V) communications, relaying sensor information to and from adjacent sensors 650, the controller 628, or the electric vehicle 505 (of FIG. 5). As a non-limiting example, V2P communications may occur from the vehicle 505 to the communications circuit 629 (and the controller 628); V2G communications may occur between the vehicle 505 and the power grid, or backbone 410 (FIG. 4); V2I communications may occur from the vehicle 505 to the infrastructure, for example, networks other than the power grid; and V2V communications may occur between two vehicles 505. In each noted example, the sensors 650 may use the wireless communications links 656 or wired communication link 654 to transmit sensor information between the various components of the wireless power transfer system 500, 600.

In an embodiment, inter-sensor communications 656 or communications via links 652 may further comprise a proprietary or encrypted communications protocol. Such a protocol may have a short range (e.g., 5-10 meters) for the networked sensors 650. V2I, I2V, and V2V communications may further be tunneled, such that information regarding road conditions, traffic and accidents, or weather, etc., may be transmitted directly to an electric vehicle 605 that are not within direct communications with a given transmitter 604 or system 600. As a non-limiting example, V2I communications and the reverse path, infrastructure-to-vehicle (I2V) communications can follow a path, vehicle-sensors-EVSE-infrastructure, in both directions, the sensors 650 serving as a link between vehicle 505 and EVSE 520. In an embodiment, this makes communications available anywhere on the road 525 having a wireless power transfer system 600, and therefore not limited to short-range radio communications, such as that available via Bluetooth™, WiFi, and other short-range communications systems.

The sensors 650 detecting the presence of a foreign object in the vicinity may transmit the detection signal (e.g., via links 652a, 652b or wired link 654) to the controller circuit 628 via the communication circuit 629. The sensors 650 that detect a foreign object may alternatively relay a detection signal through another sensor 650 to the communication circuit 629 and the controller 628. The controller circuit 628 may then, in response to the FOD detection signal, alter the transmission characteristics of the transmitter 604 (as a whole) by commanding the transmit circuitry 606 to adjust (e.g. increase or reduce) the power output of the transmitter coil 614. The presence of a foreign object in the vicinity of a transmitter 604 may present a hazard to both the charging system 600 and to a vehicle 605 driving on the road. Accordingly, the controller 628 may decrease the power output of the transmitter 604 or cease charging operations altogether in response to the presence of the foreign object 430, 530. This may decrease hazards associated with the heating of the foreign object 430, 530 (e.g., fire) and may also provide an alert indicating the presence of objects in the near field of the transmitter coil 614, that might otherwise decrease the system's 600 efficiency or present road hazards to vehicles (e.g., electric vehicle 605) in the roadway 525.

The capability of the sensors 650 to communicate with each other and relay information may also increase the flow of information from the various sensors 650 to the transmitter 604. In an embodiment, the sensors 650 may further communicate directly with the vehicle 505, 405 to relay such information.

In another embodiment, detection by the sensors 650 may ultimately result in an alert to an operator of the vehicle 505 of the presence of foreign objects 530 in the road 525 that might present a hazard to motorists. In a residential setting in which wireless charging system (e.g., system 400) may be installed (in a garage, for instance), the sensor 650 may provide an alert to a homeowner of a fire hazard resulting from the presence of a foreign object 430. In an embodiment incorporating the other noted environmental sensors, additional data regarding weather, road, or traffic conditions, among other useful data may be made available to a driver of the vehicle 505. Information gained from the sensors 650 may be communicated to the transmitter 604 and forwarded on to the power grid (e.g., the backbone 410 of FIG. 4 or V2G communications), vehicles (e.g., V2P), or other adjacent dynamic charging systems 600.

In an embodiment, the type of sensor employed as the sensors 650 (e.g., IR, thermal camera, thermistor, radar, etc.) may influence the actions commanded by the controller 628. As a non-limiting example, if a thermistor is employed as the sensor 650a, then only temperature may be reported to the transmitter 604. In an embodiment, a high temperature reading from the sensor 650a may result in a modification of the charging process of system 600, as mentioned above. Alternatively, very high temperature reading from the sensor 650a or an indication from the sensor 650b indicating the presence of a large piece of metal near the transmitter coil 614 may result in a complete shutdown of the charging process. The temperature thresholds governing such functions may vary based on many characteristics such as system architecture (e.g., sensor placement), foreign object 630 type (if determined), and power output, among other possibilities.

The controller 628 may adapt the specific power adjustment commands to the coil 614 according to a variety of conditions such as the type of sensor 650, power output of the system 600, size and location of the foreign object, among other characteristics. Advantageously, the sensors 650 may then provide the capability to detect the presence of foreign objects thus allowing remedial action to protect the system 600 against damage caused by the presence foreign objects. The sensor 650 information may also be used to alert users and operators of the system of the presence of a hazard (e.g., on the coil 714 or in the roadway 625), and to maximize the efficiency of deployed wireless power transfer systems 500, 600.

Figure 6B:
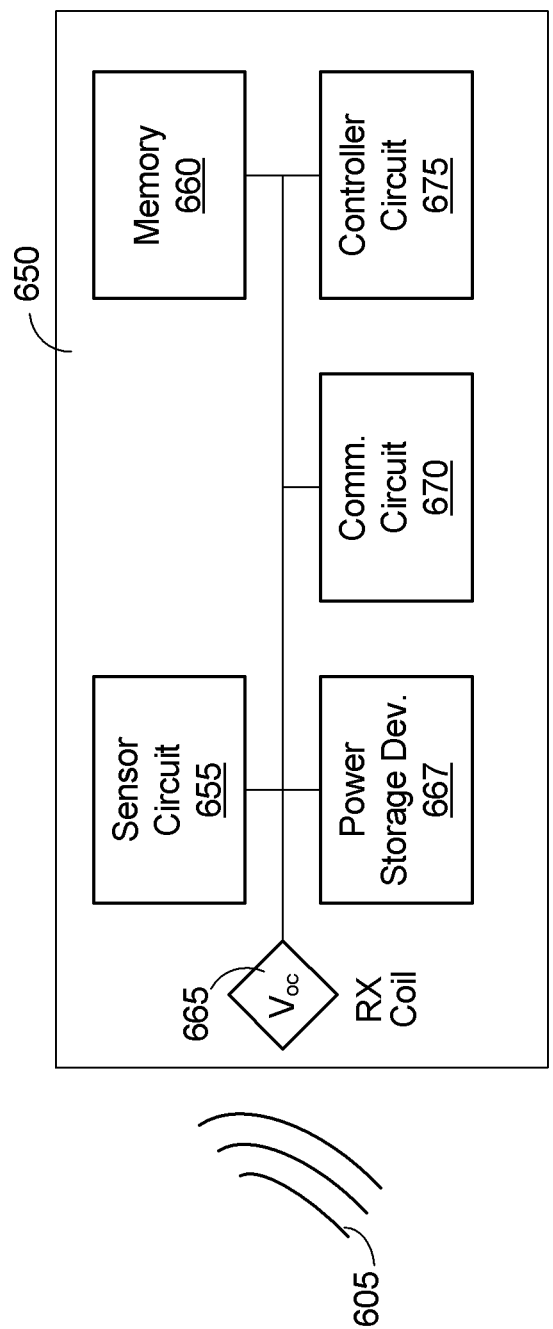
FIG. 6B is a functional block diagram of a sensor of the wireless power transfer system, in accordance with an exemplary implementation.

FIG. 6B is a functional block diagram of a sensor of the wireless power transfer system 600, in accordance with an exemplary implementation. As shown, the sensor 650 is the same as that shown in FIG. 6A. In an embodiment, the sensor 650 may comprise a sensor circuit 665 for sensing conditions surrounding the sensor 650, for example, the environmental conditions as discussed above with respect to FIG. 6A. The sensor 650 further comprises a memory 660 operably coupled to the sensor circuit 655 configured to store information from derived from the sensor circuit 655, regarding the detection of surrounding conditions. The memory 660 may be further configured to store code such as an operating system, or databases used to classify certain environmental characteristics detected by the sensor circuit 655.

The sensor 650 may further comprise a controller circuit 675 operably coupled to the sensor circuit 655 and the memory 660. The controller circuit 675 may be substantially similar to the controller circuits 628, 638 (FIG. 6A), and is configured to receive certain detection information from the sensor circuit 655 and may process the detection information using the information stored in the memory 660.

The sensor 650 further comprises a communication circuit 670 operably coupled to the controller circuit 675. The controller circuit 675 may further use the communication circuit 670 to transmit the information to communications circuit 629, communication circuits 670 of the other sensors 650, the vehicle 505, or other possible recipients as noted with respect to FIG. 6A.

The sensor 650 further comprises a receive coil 665, operably coupled to the controller 675, the sensor circuit 655, the memory 660, and the communication circuit 670. The receive coil 665 is substantially similar to the receive coil 614 and configured to receive wireless power from the wireless field 605 (FIG. 6A). Although not shown in this figure, the receiver coil 665 may provide rectified, conditioned, and filtered power for powering the various internal components of the sensor 650, similar to the discussion of FIG. 3, above. The sensor 650 may further comprise a power storage device 667 operably coupled to the receive coil 665. The power storage device 667 may receive power from and be charged by the receive coil 665. The power storage device 667 may further power the sensor circuit 655, the controller circuit 675, the communication circuit 670, and the memory 660 when power is not available from the receive coil 665.

In an embodiment, the controller circuit 675 may process the detection information from the sensor circuit 655 allowing the sensor 650 to transmit a foreign object detection message to the transmitter, indicating the presence of a foreign object. In another embodiment, the controller circuit 675 may transmit certain detection information regarding conditions surrounding the sensor circuit 655 via the communication circuit to a desired recipient without processing the detection information.

Figure 7A:
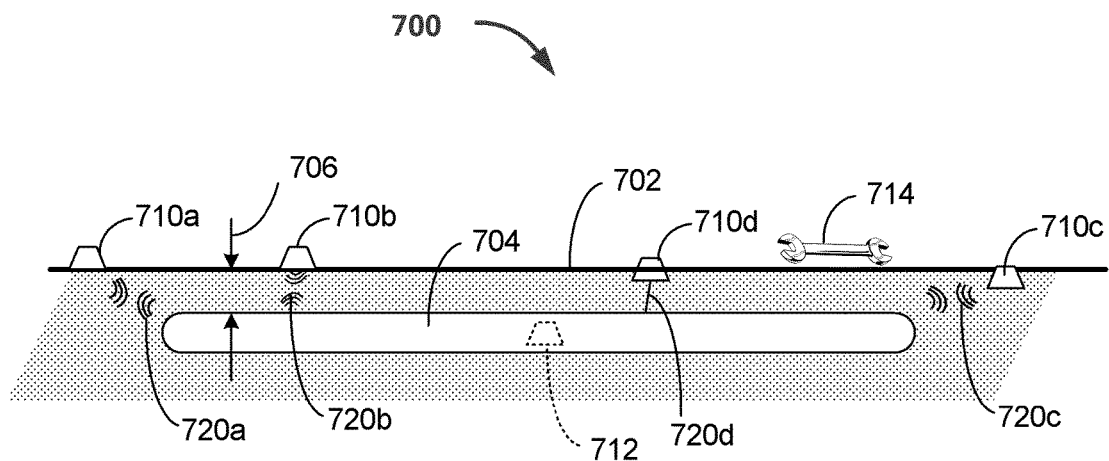
FIG. 7A is a profile view of a wireless power transfer system having a plurality of sensors, in accordance with an exemplary implementation.

FIG. 7A is profile view of a wireless power transfer system 700 having a plurality of sensors, in accordance with an exemplary implementation. The system 700 is shown mounted in a roadway ("road") 702. The system 700 may be employed in other similar ground surfaces (e.g. garage, parking lot, etc.) without departing from the spirit of the disclosure. The system 700 may be employed as depicted in previous figures such as the stationary wireless power transfer system 400 (FIG. 4) or as in the dynamic wireless charging system 500 (FIG. 5).

The system 700 is shown with a main charging pad 704 analogous to transmitter 604 of FIG. 6A, mounted beneath the surface of the road 702 by a distance 706 and surrounded by a plurality of sensors 710. The sensors 710 may be one of the various embodiments of the sensors 650 discussed with respect to FIG. 6A and may be distributed in a network or array as noted above. The single main charging pad 704 is shown in system 700 for simplicity; however multiple pads 704 may be placed in sequence as shown in FIG. 5 with respect to the dynamic wireless charging system 500. The individual components of the main charging pad 704 may correspond to the individual components of transmitter 604 of FIG. 6A, however not all of the components will be repeated here for simplicity and conciseness.

Sensors 710 may be mounted in various positions or arrangements about the main charging pad 704. Sensors 710*a*, 710*b* are shown mounted on top of the surface of the road. The sensor 710*c* is shown mounted within the road 702, flush to the surface of the road 702, while the sensor 710*d* is shown mounted within the surface of the road 702 but partially exposed above the road 702. The sensors 710 may further be positioned on top or beside the main charging pad 704 as discussed below with respect to FIG. 7B. The position of each sensor 710 may be predicated on the type, sensitivity, and/or capabilities of sensor 710 implemented. As noted below, the placement of sensors 710 may further be influenced by the power output of the main charging pad 704 (similar to transmitter 604) at various locations around the main charging pad 704 and the number and arrangement of antennas (e.g., transmission coil 614) employed.

In an embodiment, a sensor 710*a*, 710*b* mounted above the surface of the road 702 may have the ability to incorporate a camera (e.g., an IR, or standard imaging camera) or a radar transceiver (e.g., millimeter wave, LIDAR) capable of detection or viewing in a horizontal plane, parallel with the surface of the road 702. Conversely, a sensor 710*d* mounted within the road or a sensor 710*c* mounted flush to the surface of the road may be limited in the ability to view or detect anything in a horizontal plane. Accordingly, such sensors may be limited to thermistors, humidity, pressure, or similar directional or non-directional sensors. However, it should be appreciated that virtually any sensor may be mounted within or on top of the road to provide a given capability.

The main charging pad 704 may have integrated FOD capabilities, such as an embedded FOD sensor(s) 712 (shown in dashed lines), however due to the mounting position of the main charging pad 704 beneath the surface of the road 702, FOD sensor 712 may not be able to provide sufficient FOD capabilities due to adverse effects from being mounted distance 706 below the surface of the road 702 and/or the effects due to the composition of the road (e.g., concrete, asphalt). Accordingly, sensors 710 may be positioned appropriately, e.g., to increase or maximize the already-existing FOD capabilities (e.g., FOD detection range) of the main charging pad 704 having the integrated FOD sensor 712. The sensors 710 may further provide an additional FOD capability to a system 700 not equipped with an integrated FOD system.

Similar to The sensors 650 noted above in FIG. 6A, the sensors 710 may be powered by either the wireless charging field (e.g., wireless field 605) and/or a wired connection, such as wired link 654 (FIG. 6A) in the case of sensor 710*d*. Similar to above, the sensor 710*d* is shown having a wired connection 720*d*, analogous to wired link 654 (FIG. 6A).

The sensors 710*a*, 710*b*, 710*c* are each shown having a wireless communications link 720*a*-720*c*, respectively, with the main charging pad 704. While "field lines" similar to the field lines of wireless field 605 as shown in FIG. 6A are not shown here for simplicity, the wireless communications link 720*a*-720*c* may be similar to wireless field 605 but may also represent communication (e.g., communication links 652 of FIG. 6A) with the main charging pad 704.

Similar to FIG. 6A, the communications link 720 may provide the sensors 710 with communications capabilities to alert the controller 628 of main charging pad 704 of the presence of a foreign object 714 or for providing certain other desired information according to the capabilities of each of the sensors 710. In particular, the sensors may provide FOD information, in addition to other useful information including temperature, humidity, traffic information, road conditions, etc. In an embodiment, such communications to the system 700 may alert a controller (e.g., controller 628) to take remedial action in the presence of foreign object 714, commanding the reduction of power output by the main charging pad 704 or complete deactivation. Other useful communications regarding environmental, weather, and/or traffic information may be made available to vehicles on the road (e.g., the electric vehicle 505) via short range communications or other network or tunneled communications, as noted above.

The sensors 710*a*-710*c* having wireless communications links 720*a*-720*c* may further receive wireless power from the main charging pad 704, similar to sensors 650*a*-650*c* (FIG. 6A). The amount and efficiency of the power transfer from the main charging pad 704 to each of the sensors 710*a*-710*c* may be affected by individual sensor 710 position and distance from the near field of the main charging pad 704 (e.g., the wireless field 605).

In particular, the wireless field 605 may decrease in power with range. In an embodiment, the wireless field 605 may decrease exponentially with the distance from the source (e.g., coil 614). As such, the distance between each wireless sensor 710*a*-710*c* and the main charging pad 704, may be a factor in the design of the sensor 710 network. In an embodiment, the wireless field 605 may be "low," (e.g., a low power measurement or a weak field) in order to minimize possible damage to integrated electronics within each of the sensors 710. However, the wireless field 605 may also be "high" (e.g., powerful) enough to allow for sufficient power transfer to the particular wireless sensor 710*a*-710*c*. Thus an optimum distance or range between the sensor 710*a*-710*c* and the main charging pad 704 may be defined by a given design, based on specific network architecture, transmission field shape, power levels, and/or resonant frequency of a given wireless field 605 as noted above with respect to FIG. 6A. In an embodiment, the distance between the wireless sensors 710 and the main charging pad 704 may be several centimeters (cm). For example, in order to provide sufficient wireless power, the sensors 710 may be located within five (5) to 50 cm of the edges main charging pad 704. In certain embodiments, the sensors 710 may be located as far as one meter (1 m) from the main charging pad where the transmitter 604 and the transmitter coil 614 are constructed larger dimensions and sufficient transmit power.

Similar to the discussion above with respect to FIG. 5, the main charging pad 704 may be operated to activate and deactivate charging operations based on the presence of a vehicle 505 or other command from the controller 628. In an embodiment, wireless power may therefore not always be available for the wireless sensors 710*a*-701*c*. This situation may present a hazard if the sensors 710 are not powered and the foreign object 714 is not detected.

Accordingly, sensors 710 may function at a minimum power state, or minimum power level (e.g., zero to five percent of nominal value) up to maximum rated inductive power transfer (IPT) power output during charging operations without sustaining damage to the individual sensors 710. The sensor 710 design, together with appropriate magnetic or electrical shielding may be employed to avoid or minimize damage to or saturation of the sensor 710 that might otherwise degrade the sensor 710 performance.

In an embodiment the network of sensors 710 may incorporate at least one sensor 710*d* with a wired connection 720*d* that may power the sensor 710*d* and provide FOD capabilities when the coil 614 or the main charging pad 704 is deactivated. Alternatively, the sensors 710 may further comprise a power storage device (e.g., a battery or capacitor—not shown), so the sensor(s) 710 can maintain a minimal power state and detect objects (e.g., foreign object 714) even in the absence of power transmitted (e.g., wireless field 605) by the main charging pad 704.

In an embodiment, power storage may not be limited to just the wireless sensors 710*a*-710*c*. The sensor 710 having the wired connection 720*d* may also be deactivated when the main charging pad 704 is deactivated, thus an additional power storage device such as the noted battery or capacitor may also be a benefit if included in the wired sensor 710*d*. In both cases, the sensors 710 may continue to provide FOD capabilities to the system 700 while the main charging pad 704 is deactivated (e.g., powered down). This may allow the sensors 710 to provide sufficient warning in the presence of foreign object 714 and prevent the system from commencing charging operations.

In an embodiment, the use of multiple or switched transmission coils 614 within a main charging pad 704 may also be implemented to minimize sensor 710 damage. For example, the main charging pad 704 may comprise two separate coils (not shown). Such an embodiment may comprise a larger coil 614 for a low-power environment, and a smaller coil 614 for full power. This may provide reduced power consumption to the overall system 700 while maintaining the FOD capability by continuously providing wireless power to each sensor 710.

In an embodiment, the main charging pad 704 may conserve power by adjusting power output to a low power setting or by powering down completely. As such, the sensors 710 may also enter a "sleep mode" if wireless power is not available or to conserve battery power. In an embodiment, the sensors 710 may also incorporate a "wake-up" function that activates the sensors 710 when fractional power is available from the main charging pad 704 during activation of charging operations. This may be incorporated into sensors 710 with or without an integrated power storage device. This may further provide minimal power consumption outside normal charging operations, while providing full FOD capabilities once the main charging pad 704 begins wireless power transfer. Such an embodiment may be able to detect foreign objects (e.g., foreign object 714) after power up, but before the main charging pad 704 reaches full power.

In another embodiment, several switchable antennas (e.g., multiple transmit coils 614) can be positioned such that the wireless field 605 (e.g. magnetic or electric field) reception is optimized for specific implementations and/or aligned for low-power environments. Further, the switchable antennas (e.g., multiple transmit coils 614) may also be positioned (e.g., misaligned) such that the wireless field 605 is reduced in for high-power environments. Such an architecture may provide additional options for maintaining a FOD capability and wirelessly powering the sensors 710*a*-710*c* during charging operations when the main charging pad 704 is at full power. This may also provide a method to avoid damaging or saturating the individual sensors 710 by placing the sensors 710 in specific, "lower-power" areas of the field 605. Accordingly, sensor 710 placement and design may dictate specific placement positions for each sensor 710 such that each is placed to maximize or optimize power transfer and foreign object 714 detection capabilities.

Figure 7B:
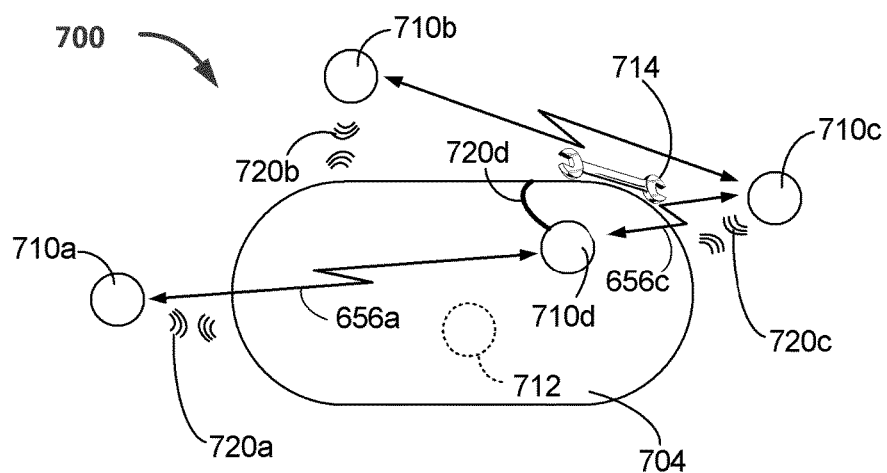
FIG. 7B is a top view of the wireless power transfer system of FIG. 7A, in accordance with an exemplary implementation.

FIG. 7B is a top view of the wireless power transfer system of FIG. 7A, in accordance with an exemplary implementation. As shown, the sensors 710 are distributed in various positions around the main charging pad 704, similar to FIG. 7A.

The integrated sensor 712 is shown in dashed lines indicating its position below the surface of the road 702 and within the main charging pad 704. As discussed with respect to FIG. 7A, the sensors 710*a*-710*c* are disposed around the main charging pad having wireless communications link 720*a*-720*c*, respectively with the main charging pad 704. The sensor 710*d* is shown having a wired connection 720*d* with the main charging pad 704, positioned within the surface of the road 702 (as shown in FIG. 7A) and above the main charging pad 704. The location of the sensors 710 may serve to both increase the detection range and resolution of the FOD capabilities of the system 700, augmenting the capabilities of the integrated FOD sensor 712 (if installed). The specific locations of individual sensors 710 may be based on the strength of the wireless field 605 in particular locations around the main charging pad 704 and thus the ability of a given sensor 710 to receive wireless power. Placement of sensors 710 may also vary based on the depth of installation of the main charging pad (e.g., distance 706) if mounted below the surface of the road 702.

The foreign object 714 is shown in close proximity of the main charging pad 704, nearest to the sensors 710*c*, 710*d*. In an embodiment, when main charging pad 704 begins producing a full power wireless field 605 for wireless charging operations, a metallic foreign object 704 may absorb the transmitted energy. Foreign object 714 is depicted as a wrench, which may be of a metallic composition, but other foreign objects 714 may be any debris in the area of installation, for example, the road 702, the road 525 of FIG. 5, or in a parking area such as that shown in FIG. 4. As the power of the wireless field 605 is absorbed by the foreign object 714, it may rise in temperature presenting a heating hazard. If found in a road 702, 525, the foreign object 714 may further present a hazard to vehicles 605.

When one or more of the sensors 710 detects foreign object 714, the sensors 710 may relay information related to the detection (e.g., increased temperature, thermal imagery, optical data, etc.) via the communications circuit 629 to the controller 628 in order take appropriate action to adjust the power output of the transmitter 604, notify an operator of the system 700, and/or other actions as appropriate. The inter-sensor communication 656 (also shown in FIG. 6A) may further be available to relay information from one sensor to another. Referring briefly to FIG. 6A, inter-sensor communication 656*a*-656*b* are shown indicating inter-sensor communication between sensors 710*a*, 710*b*, and sensors 710*b*, 710*c*. In FIG. 7, inter-sensor communication 656*c* is also depicted illustrating inter-sensor communication between wireless sensor 710*c* and wired sensor 710*d*. As such, the sensor 710*d* may further be equipped to communicate wirelessly with other sensors 710 or the main charging pad 704. As noted above, such information may be relayed to the other sensors 710, the main charging pad 704, the vehicle 605, or other wireless charging systems 700, enabling the transmission of the sensor 710 information.

Figure 8:
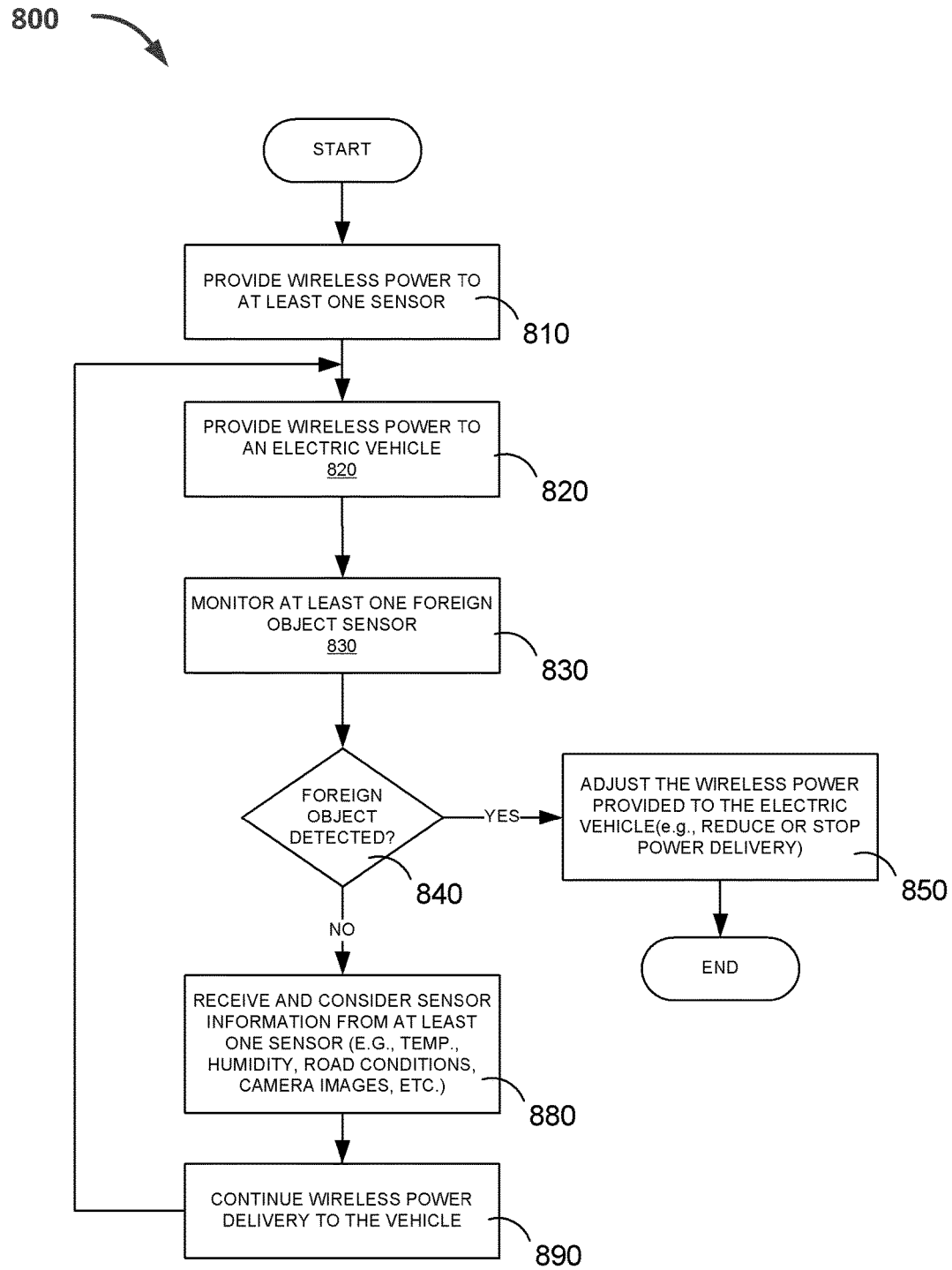
FIG. 8 illustrates a flowchart depicting a method of providing wireless power to the sensors of FIG. 7A or FIG. 7B, in accordance with an exemplary implementation.

FIG. 8 illustrates a flowchart depicting a method 800 of providing wireless power to the sensors of FIG. 7A and FIG. 7B, in accordance with an exemplary implementation. The method shown in FIG. 8 may be implemented via one or more of the devices in a controller substantially similar to the control circuit 628 of a wireless charging system including the main charging pad 704 of FIG. 7A-7B and the transmitter 604 of FIG. 6A. The method 800 may be performed in conjunction with at least one sensor or a network of sensors such as sensors 650 of FIG. 6A or sensors 710 of FIG. 7. In an embodiment, the controller 628 may command activation or deactivation of a wireless field substantially similar to wireless field 605 (FIG. 6A), providing wireless power to the sensors. Once power is delivered to the one or more sensors, the wireless field may further provide power to an electric vehicle such as the vehicle 505 of FIG. 5, or the vehicle 605 of FIG. 6A. If a foreign object is detected by one or more of the sensors, the controller may receive a detection signal from the sensor and command a reduction in wireless field transmission power or complete shutdown.

The process 800 begins at block 810, where the controller 628 may command the activation of the wireless charging pad such as main charging pad 704 (FIG. 7) or base pad 415 (FIG. 4), providing wireless power to at least one sensor. The sensors may then be capable of monitoring the surrounding area for the presence of foreign objects or other environmental conditions.

At block 820, the charging pad may further provide wireless power to an electric vehicle. In an embodiment, a vehicle may approach the charging base pad such as 515 (FIG. 5) at which point a proximity sensor such as the proximity sensors 510 of FIG. 5 may indicate the presence of a vehicle 505 to the controller 628. In response, the controller 628 may then command an increase in the power output of the transmitter such as the transmitter 604 (FIG. 6A) of the charging pad such that sufficient wireless power is delivered to the vehicle and wireless sensors.

At block 830, the controller 628 may monitor at least one of the sensors 710 (FIG. 7A-7B) for appropriate indications, based on the capabilities of the individual sensors 710. In an embodiment, the sensors may wirelessly transmit sensor information via wireless links such as the wireless links 720a-720c (FIG. 7A-7B) to the controller 628 or to other sensors 710, or transmit sensor information via a wired link 720d (FIG. 7A-7B) to the controller 628. The controller 628 may monitor the sensors 710 continuously, polling each of the sensors 710 periodically, or the controller 628 may periodically or continuously receive independently transmitted information from each of the sensors 710.

At decision block 840 the controller 628 may determine based on the information received from the at least one foreign object sensors 710 whether the sensor has detected a foreign object. As a non-limiting example, an abnormally high temperature at a sensor 710 may indicate detection of a foreign object. In an embodiment, the abnormally high temperature may be localized at a single foreign object sensor 710 due to absorption of energy from the wireless field 605, indicating the presence of a foreign object 714 (FIG. 7A-7B). In another embodiment, a thermal or imaging camera may indicate or verify the presence of a foreign object 714. In an embodiment, the controller 628 may determine the detection based on indications and data received from the sensors 710. In another embodiment, certain detection processes may be distributed to the sensors 710, whereby the sensors 710 may send a detection signal to the controller 628.

At block 850, when the foreign object detection signal is sent from the sensor to the controller 628, the controller may command an adjustment to the power output of the transmitter 604 to reduce or deactivate the wireless field 605. The process 800 may end after the wireless power level adjustment.

If no foreign object is detected at decision block 840, then the controller 628 may continue to receive and consider sensor information from the at least one sensor 710 (e.g., temp., humidity, road conditions, camera images, etc.). In an embodiment, the sensor information may be further utilized by the controller 628 to command power adjustments, or the information may be forwarded on to other wireless charging systems 700 (FIG. 7), or to the vehicle 505.

At block 890, because no foreign objects are detected, the process 800 will continue wireless power delivery to the vehicle, returning the process 800 to block 820.

Figure 9:
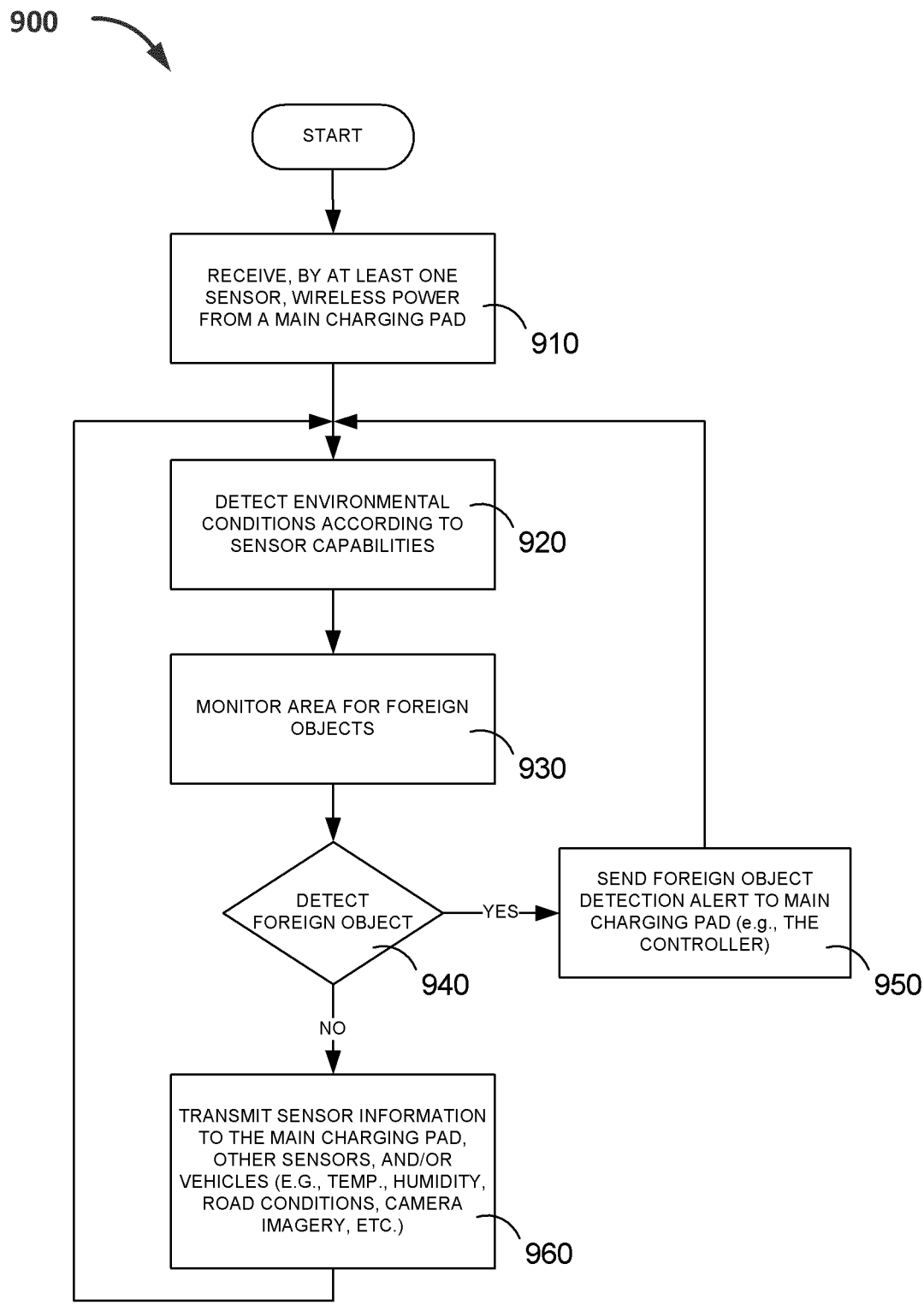
FIG. 9 illustrates a flowchart depicting a method of operating one or more of the sensors, in accordance with an exemplary implementation.

FIG. 9 illustrates a flowchart depicting a method 900 of operating one or more of the sensors 710 (FIG. 7A-7B), in accordance with an exemplary implementation.

The method 900 may be implemented via one or more of the sensors substantially similar to the sensor 710 (or network of sensors 710) of a wireless charging system, including the main charging pad 704 of FIG. 7A-7B and the transmitter 604 of FIG. 6A. The method 900 may be performed in conjunction with a controller such as the control circuit 628 of FIG. 6A. In an embodiment, at least one of the sensors 710 may receive wireless power from a main charging pad, substantially similar to main charging pad 704. Once power is delivered to the one or more sensors, the sensors 710 may monitor the surrounding environment for certain changes or for an indication of the presence of a foreign object and report such indications to the controller 628 for an appropriate response, as discussed below.

The process 900 starts with block 910 where the at least one sensor 710 receives wireless power from a main charging pad 704.

At step 920, the sensors 710 may detect environmental conditions according to the sensor 710 capabilities. As a non-limiting example, some sensors 710 may only detect temperature changes, where as other sensors 710 may provide imagery (e.g., color or thermal imagery), humidity data, or traffic conditions, among many other possibilities.

At block 930, the sensors may monitor the environment for foreign objects such as foreign object 714 (FIG. 7A-7B). In an embodiment, the sensors 710 may only report indications according to sensor capabilities to the controller 628. In certain embodiments, the sensors 710 may be equipped to independently detect and report the presence of a foreign object to the controller 628.

If a foreign object 714 is detected at decision block 940, then the sensor 710 may send a foreign object detection alert to the main charging pad 704, or more particularly, the controller 628. The sensor 710 may then continue detecting environmental conditions at block 920.

If a foreign object is not detected at decision block 940, at block 940 the sensor 710 may transmit the sensor information to the main charging pad 704, other sensors 710, and/or vehicles 605, making the detection information available to other systems and users.

What is claimed is:

1. An apparatus for detecting a condition within a wireless charging field, the apparatus comprising:

a wireless power receiver configured to receive wireless charging power from a wireless power charging transmitter;

a first sensor circuit that is at least partially disposed within a ground surface, the first sensor operationally coupled to and configured to be charged or powered by the wireless power receiver, and further configured to detect the condition; and a controller circuit operationally coupled to the first sensor circuit and the wireless power receiver, the controller circuit configured to communicate the detected condition or transmit a shutdown command to the wireless power charging transmitter, via a communications circuit, in response to the detected condition.

2. The apparatus of claim 1, wherein the first sensor circuit is further configured to cause the wireless power charging transmitter to adjust a transmitted power level of the wireless power charging transmitter or to deactivate wireless power charging in response to the detected condition.

3. The apparatus of claim 1, wherein the detected condition comprises at least one of a presence of a foreign object, a variation in a magnetic field, a measurement temperature, a measurement of humidity, a measurement of air pollution, and a measurement of traffic density.

4. The apparatus of claim 1, wherein the first sensor circuit is further configured to transmit information about the detected condition to an electric vehicle, the information indicating a degraded operating mode of the wireless power charging transmitter or a ground or road warning.

5. The apparatus of claim 1, wherein the first sensor circuit is further configured to communicate information between a second sensor circuit and the wireless charging transmitter, between the wireless charging transmitter and a first vehicle, and between the first vehicle and a second vehicle.

6. The apparatus of claim 1 further comprising:
a power storage device operationally coupled to the wireless power receiver and the first sensor circuit, the power storage device configured to:
receive wireless charging power from the wireless power receiver when the wireless power charging transmitter is at a first power level, and
power the first sensor circuit when the wireless power charging transmitter is at a second power level, the second power level being lower than the first power level.

7. The apparatus of claim 1, wherein the first sensor circuit is further configured to be charged or powered by power received from a power storage device, or power received from the wireless power receiver when the wireless power charging transmitter is transmitting power at a power level that is insufficient to charge a vehicle and sufficient to charge or power the wireless receiver.

8. The apparatus of claim 1, wherein the first sensor circuit is further configured to communicate information about the detected condition to a second sensor circuit, the second sensor circuit configured to communicate the detected condition to the wireless power transmitter.

9. The apparatus of claim 1, wherein the first sensor circuit is further configured to detect a presence or absence of a vehicle within an area of the first sensor circuit and configured to communicate information about the presence or absence of the vehicle to a controller that is configured to determine a traffic condition based on information from the first sensor circuit and information from a second sensor circuit about a presence or absence of another vehicle in an area of the second sensor circuit.

10. A method for detecting a condition within a wireless charging field, the method comprising:
receiving wireless charging power from a wireless power charging transmitter at a wireless power receiver;
detecting the condition at a first sensor circuit that is at least partially disposed within a ground surface, operationally coupled to the wireless power receiver, and charged or powered by the wireless power receiver; and
communicating the detected condition or transmitting a shutdown command to the wireless power charging transmitter, in response to the detected condition.

11. The method of claim 10, further comprising:
adjusting a transmitted power level of the wireless power charging transmitter or deactivating wireless power charging in response to the detected condition.

12. The method of claim 10, wherein detecting the condition comprises detecting at least one of a presence of a foreign object, an variation in a magnetic field, a measurement of temperature, a measurement of humidity, a measurement of air pollution, and a measurement of traffic density.

13. The method of claim 10, further comprising:
transmitting information about the detected condition to an electric vehicle, the information indicating a degraded operating mode of the wireless charging transmitter or a ground or road warning.

14. The method of claim 10, further comprising:
communicating, via the first sensor circuit, information about the detected condition from a second sensor circuit to the wireless charging transmitter, from the wireless charging transmitter to a first vehicle, and from the first vehicle to a second vehicle.

15. The method of claim 10 further comprising:
receiving wireless charging power from the wireless power receiver at a power storage device when the wireless power charging transmitter is at a first power level, the power storage device being operationally coupled to the wireless power receiver and the first sensor circuit; and
powering the first sensor circuit with the power storage device when the wireless power charging transmitter is at a second power level, the second power level being lower than the first power level.

16. The method of claim 10, further comprising:
charging or powering the first sensor circuit with power received from a power storage device, or power received from the wireless power receiver when the wireless power charging transmitter is transmitting power at a power level that is insufficient to charge a vehicle and sufficient to charge or power the wireless receiver.

17. The method of claim 10, further comprising:
communicating information about the detected condition from the first sensor circuit to a second sensor circuit, the second sensor circuit configured to communicate the detected condition to the wireless power transmitter.

18. The method of claim 10, further comprising:
detecting a presence or absence of a vehicle within an area of the first sensor circuit; and
communicating information about the presence or absence of the vehicle to a controller that is configured to determine a traffic condition based on the first sensor circuit information and a second sensor circuit information about a presence or absence of another vehicle in an area of the second sensor circuit.

19. An apparatus for detecting a condition within a wireless charging field, the apparatus comprising:
   means for receiving wireless charging power from a wireless power charging transmitter;
   first means for detecting the condition, the first detecting means at least partially disposed within a ground surface and operationally coupled to and charged or powered by the receiving means; and
   means for controlling the first detecting means and the receiving means, the controlling means configured to communicate the detected condition or transmit a shutdown command to the means for providing wireless charging power, via a communications circuit, in response to the detected condition.

20. The apparatus of claim 19, wherein the receiving means comprises a wireless power receiver, and wherein the first detecting means comprises a first sensor circuit.

21. The apparatus of claim 19, wherein the first detecting means is further configured to cause the wireless power charging transmitter to adjust a transmitted power level of the wireless power charging transmitter or to deactivate wireless power charging in response to the detected condition.

22. The apparatus of claim 19, further comprising:
   means for storing power operationally coupled to the receiving means and the first detecting means, wherein the power storage means is configured receive wireless charging power from receiving means when the wireless power charging transmitter is at a first power level, and wherein the power storage means is further configured to power the first detecting means when the wireless power charging transmitter is at a second power level, the second power level being lower than the first power level.

23. An apparatus for providing wireless power, comprising:
   a wireless power transmitter configured to provide wireless power to a first sensor; and
   a first controller configured to receive information from the first sensor, the information indicative of a presence of a foreign object, the first controller further configured to reduce power transmitted from the wireless power transmitter to an electric vehicle in response to the information,
   wherein the first controller is further configured to receive information about a presence or absence of a vehicle within an area of the first sensor and wherein the first controller is further configured to determine a traffic condition based on the information from the first sensor and information from a second sensor about a presence or absence of another vehicle in an area of the second sensor.

24. The apparatus of claim 23, wherein the information comprises information about at least one of a presence of a foreign object, a variation in a magnetic field, a measurement of temperature, a measurement of humidity, a measurement of air pollution, and a measurement of traffic density.

25. The apparatus of claim 23, wherein the first controller is further configured to communicate the information from the first sensor to at least one of the electric vehicle, a second controller, and an infrastructure network.

26. The apparatus of claim 23, wherein the wireless power transmitter is further configured to provide wireless power at a first power level sufficient to wirelessly power an electric vehicle and the first sensor, and a second power level sufficient to wirelessly power the first sensor, the second power level being lower than the first power level, and wherein the second power level is insufficient to power the electric vehicle.

* * * * *